United States Patent
Takamatsu et al.

(10) Patent No.: US 9,560,841 B2
(45) Date of Patent: Feb. 7, 2017

(54) SPINNING REEL FOR FISHING AND A BRAKING OPERATION LEVER FOR THE ROTOR BRAKING DEVICE

(71) Applicant: Shimano Inc., Osaka (JP)

(72) Inventors: Takuji Takamatsu, Osaka (JP); Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 384 days.

(21) Appl. No.: 14/296,197

(22) Filed: Jun. 4, 2014

(65) Prior Publication Data

US 2014/0374523 A1 Dec. 25, 2014

(30) Foreign Application Priority Data

Jun. 21, 2013 (JP) .................................. 2013-130515

(51) Int. Cl.
*A01K 89/01* (2006.01)
*A01K 89/027* (2006.01)

(52) U.S. Cl.
CPC .................................. *A01K 89/027* (2013.01)

(58) Field of Classification Search
CPC A01K 89/027; A01K 89/0275; A01K 89/029; A01K 89/0126; A01K 89/01
See application file for complete search history.

(56) References Cited

U.S. PATENT DOCUMENTS

| | | | |
|---|---|---|---|
| 2,918,227 A * | 12/1959 | Mauborgne | A01K 89/01 242/243 |
| 4,529,142 A * | 7/1985 | Yoshikawa | A01K 89/027 242/243 |
| 5,863,007 A * | 1/1999 | Sato | A01K 89/01 242/249 |
| 5,988,549 A * | 11/1999 | Hitomi | A01K 89/027 242/243 |
| 6,095,008 A * | 8/2000 | Hitomi | A01K 89/01 242/247 |

(Continued)

FOREIGN PATENT DOCUMENTS

| | | |
|---|---|---|
| CN | 102210290 A | 10/2011 |
| JP | 2001-128599 A | 5/2001 |
| JP | 2006-129775 A | 5/2006 |

OTHER PUBLICATIONS

European Search Report of corresponding EP Application No. 14 17 2380.9 dated Oct. 7, 2014.

*Primary Examiner* — Emmanuel M Marcelo
(74) *Attorney, Agent, or Firm* — Global IP Counselors

(57) ABSTRACT

A braking operation lever for a rotor braking device of a spinning reel for applying a braking force to the rotation of a rotor rotatably supported by a reel body, the braking operation lever includes a lever main body, an operating section, a brake shoe, an elastic member, and a fall out prevention mechanism. The lever body is rotatably supported by the reel body. The operating section is configured to perform a braking operation, and is disposed on a first end part of the lever main body. The brake shoe is disposed on a second end part of the lever main body, and is configured to be pressed against the rotor by operation of the operating section. The elastic member is disposed between the brake shoe and the lever main body. The fall out prevention mechanism prevents the elastic member from falling out of the brake shoe.

18 Claims, 11 Drawing Sheets

(56) References Cited

U.S. PATENT DOCUMENTS

| | | | |
|---|---|---|---|
| 6,343,418 B1* | 2/2002 | Hitomi | A01K 89/01 164/98 |
| 2006/0169814 A1* | 8/2006 | Ikuta | A01K 89/027 242/295 |
| 2006/0266861 A1* | 11/2006 | Kitajima | A01K 89/01 242/322 |
| 2011/0042500 A1* | 2/2011 | Saito | A01K 89/01 242/224 |

* cited by examiner

SPINNING REEL FOR FISHING AND A BRAKING OPERATION LEVER FOR THE ROTOR BRAKING DEVICE

CROSS-REFERENCE TO RELATED APPLICATIONS

This application claims priority to Japanese Patent Application No. 2013-130515, filed on Jun. 21, 2013. The entire disclosure of Japanese Patent Application No. 2013-130515 is hereby incorporated herein by reference.

BACKGROUND

Field of Invention

The present invention relates to a spinning reel for fishing and a braking operation lever for a rotor braking device installed on the spinning reel.

Background Information

When surf fishing, a lever brake-type spinning reel as shown, for example, in Japanese Laid-Open Patent Publication No. 2006-129775 is often used. This kind of spinning reel comprises a rotor braking device. The rotor braking device is a device that applies the brakes to the rotation of the rotor in the line delivering direction (the reverse rotation) and that is equipped with a braking drum that rotates in conjunction with the rotation of the rotor in the line delivering direction and a braking operation lever for conducting the braking operation of the braking drum (hereinafter, referred to simply as the "brake lever"). Then, by operating the brake lever, the braking force can be adjusted to an amount that will not prevent fish from biting the bait.

More specifically, the brake lever is formed into a circular arch shape, and the center part in the longitudinal direction is pivotally mounted to the reel body. Additionally, an operating section that is disposed close to the fishing pole mounting portion is installed at the tip of the brake lever, and a brake shoe that is pressed against the braking drum is installed at the proximal end of the brake lever. Then, if the operating section of the brake lever is operated in the direction approaching the fishing pole mounting portion, the brake shoe comes into contact with the inner peripheral surface of the braking drum, and the braking force is applied to the reverse rotation of the rotor.

SUMMARY

The brake shoe of the rotor braking device such as that mentioned above is generally formed of synthetic resin. To achieve a longer life wear can be suppressed by increasing the rigidity of the brake shoe. However, if the rigidity of the brake shoe is significantly increased, the adjustment range for the braking force narrows, making precise control of the tension of the fishing line difficult.

One object of the present invention is to suppress the wear of the brake shoe and expand the adjustment range of the braking force in a rotor braking device of a spinning reel for fishing.

Another object of the present invention is to eliminate or reduce the narrowing of the adjustment range for the braking force.

The braking operation lever of the rotor braking device according to the first aspect of the present invention is disposed on a rotor braking device that applies a braking force to the rotation of a rotor that is rotatably supported by the reel body of the spinning reel for fishing. This braking operation lever comprises a lever main body rotatably supported by the reel body, an operating section for the braking operation disposed on a first end part of the lever main body, a brake shoe disposed in a second end part of the lever main body and is configured to be pressed against the rotor by operation of the operating section, an elastic member, and a fall out prevention mechanism. The elastic member is disposed between the brake shoe and the lever main body. The fail out prevention mechanism prevents the elastic member from falling out of the brake shoe.

With this braking operation lever, when the operating section is operated, the lever main body rotates, and the brake shoe disposed on the end part of the lever main body is pressed against the rotor. With this, the braking force is applied to the rotation of the rotor. At this time, the braking force can be adjusted by adjusting the operating force that is applied to the operating section, and the tension of the fishing line can be adjusted.

Here, an elastic member is disposed on the lever main body side of the brake shoe, so that, when the braking operation lever is operated and the brake shoe is pressed against the rotor, the elastic member is elastically deformed. With the degree of the deformation of this elastic member, the pressing force of the brake shoe on the rotor can be changed. For this reason, when compared with a conventional configuration the adjustment range of the braking force can be expanded, and the tension of the fishing line can be delicately controlled.

If the elastic member is simply adhered to the brake shoe or the lever main body, there is the risk that the elastic member will fall out of the brake shoe or the lever main body during use. Additionally, if the elastic member falls out, the braking force will not be applied.

Therefore, in the present invention, a fall out prevention mechanism that prevents the elastic member from falling out of the brake shoe is installed, so that the elastic member will not easily fall out of the brake shoe.

The braking operation lever of the rotor braking device according to the second aspect of the present invention is configured so that, in the braking operation lever of the first aspect, the elastic member is less rigid than the brake shoe and so that, when the brake shoe is pressed against the rotor, the elastic member will elastically deform and transmit the pressing force from the lever main body to the brake shoe. Here, the elastic member is more easily elastically deformed so that the adjustment range of the braking force can be expanded, and as mentioned above, the tension of the fishing line can be delicately controlled.

The braking operation lever of the rotor braking device according to the third aspect of the present invention is configured so that, in the braking operation lever of the first or the second aspect, the brake shoe comprises an abutting section, a pair of leg sections, and an elastic member housing section. One end surface of the abutting section is in contact with the rotor and is disposed so as to form a gap between the abutting section and the lever main body. The pair of leg sections is disposed on the opposite side of the brake shoe from the abutting section and engages the lever main body. The elastic member housing section, which is disposed between the abutting section and the pair of leg sections, comprises a housing space where the elastic member is housed. The elastic member is detachable from the housing space only via one opening formed on the elastic member housing section. Additionally, a protrusion is disposed in the one opening of the elastic member housing section to prevent the elastic member mounted in the housing space from falling out, and the fall out prevention mechanism is a protrusion that is disposed in surrounding the housing space as well as the one opening.

Here, the elastic member is housed in a housing space formed in the elastic member housing section of the brake shoe. The elastic member is detachable from this housing space only via one opening. Additionally, a protrusion is formed on this one opening, and the protrusion prevents the elastic member from falling out of the housing space.

The braking operation lever of the rotor braking device according to the fourth aspect of the present invention is configured so that, in the braking operation lever of the first or the second aspect, the brake shoe comprises an abutting section, a pair of leg sections, and a center part. The abutting section, with one end surface configured to contact the rotor, is disposed so as to form a space between the abutting section and the lever main body and comprises a first through-hole that extends through one end surface to another end surface. The pair of leg sections is disposed on the opposite side of the brake shoe from the abutting section and engages with the lever main body. The center part is disposed between the abutting section and the lever main body and comprises a second through-hole that extends through the abutting section side surface toward the opposite side surface. The abutting section and the pair of leg sections are integrally formed, and the center part is formed separately from the abutting section and the pair of leg sections. The elastic member comprises an elastic deformation section that is disposed between the abutting section and the center part, as well as a fixed section that extends through each of the through-holes of the abutting section and the center part. Additionally, the fall out prevention mechanism is fixed section formed on the elastic member.

Here, the fixed section is formed on a part of the elastic member, and the fixed section extends through the through-holes of the abutting section and the center part. For this reason, when compared to a case in which the elastic member is simply fixed with an adhesive agent, the adhesion of the elastic member to the brake shoe is strong.

The braking operation lever of the rotor braking device according to the fifth aspect of the present invention is configured so that, in the braking operation lever of the fourth aspect, both the first through-hole of the abutting section and the second through-hole of the center part comprise an engaging recess that has a larger diameter than the through-holes in the end parts opposite the elastic member. Additionally, the fixed section of the elastic member comprises an engaging section that engages the engaging recess.

Here, the engaging section of the elastic member engages the abutting section and the engaging recess of the center part. Therefore, the elastic member is further prevented from falling out.

The braking operation lever of the rotor braking device according to the sixth aspect of the present invention further comprises a deformation restricting mechanism, wherein, in the braking operation lever of any one of the first to the fifth aspects, the elastic deformation of the elastic member is restricted a predefined amount; after the elastic member is elastically deformed to the predefined amount, the operating force of the operating section is directly transmitted from the lever main body to the brake shoe.

When the elastic member is installed between the brake shoe and the lever main body, upon operating the braking operation lever, the elastic member is elastically deformed, and the operating force is absorbed by the elastic member. For this reason, obtaining a large braking force becomes difficult.

Therefore, in this embodiment, the elastic member further comprises a deformation restricting mechanism, the elastic deformation of the elastic member being restricted to a predefined amount; after the elastic member is elastically deformed by the predefined amount, the operating force of the operating section is directly transmitted from the lever main body to the brake shoe.

After the elastic member is elastically deformed to the predefined amount, the elastic deformation of the elastic member is restricted. Thereafter, the operating force of the operating section is directly transmitted from the lever main body to the brake shoe. Therefore, even in a case when an elastic member is disposed between the brake shoe and the lever main body, a large braking force can be obtained.

The braking operation lever of the rotor braking device according to the seventh aspect of the present invention is configured so that, in the braking operation lever of any one of the first to the sixth aspects, the elastic member is rubber.

The spinning reel for fishing according to an eighth aspect of the present invention comprises a reel body having a fishing pole mounting portion and a leg section that extends from the fishing pole mounting portion, a rotor that is rotatably mounted to the reel body, and a rotor braking device that has a braking operation lever according to any one of the first to the seventh aspects of the present invention and that applies a braking to the rotation of the rotor.

The spinning reel for fishing according to a ninth aspect of the present invention is configured so that, in the spinning reel for fishing of the eighth aspect, the rotor comprises a rotor main body that is rotatably supported by the reel body and a braking drum that is rotatably supported by the reel body. The braking drum comprises a braking drum main body having a braking surface with which the brake shoe comes into contact and a one-way clutch that transmits only the rotation of the reel body in the line delivering direction to the braking drum main body.

As described above, according to the present invention, the wear of the brake shoe of the braking operation lever installed on the rotor braking device can be suppressed while expanding the adjustment range of the braking force. Additionally, the elastic member disposed in the braking operation lever is prevented from falling out.

DETAILED DESCRIPTION OF THE INVENTION

Figure 1:
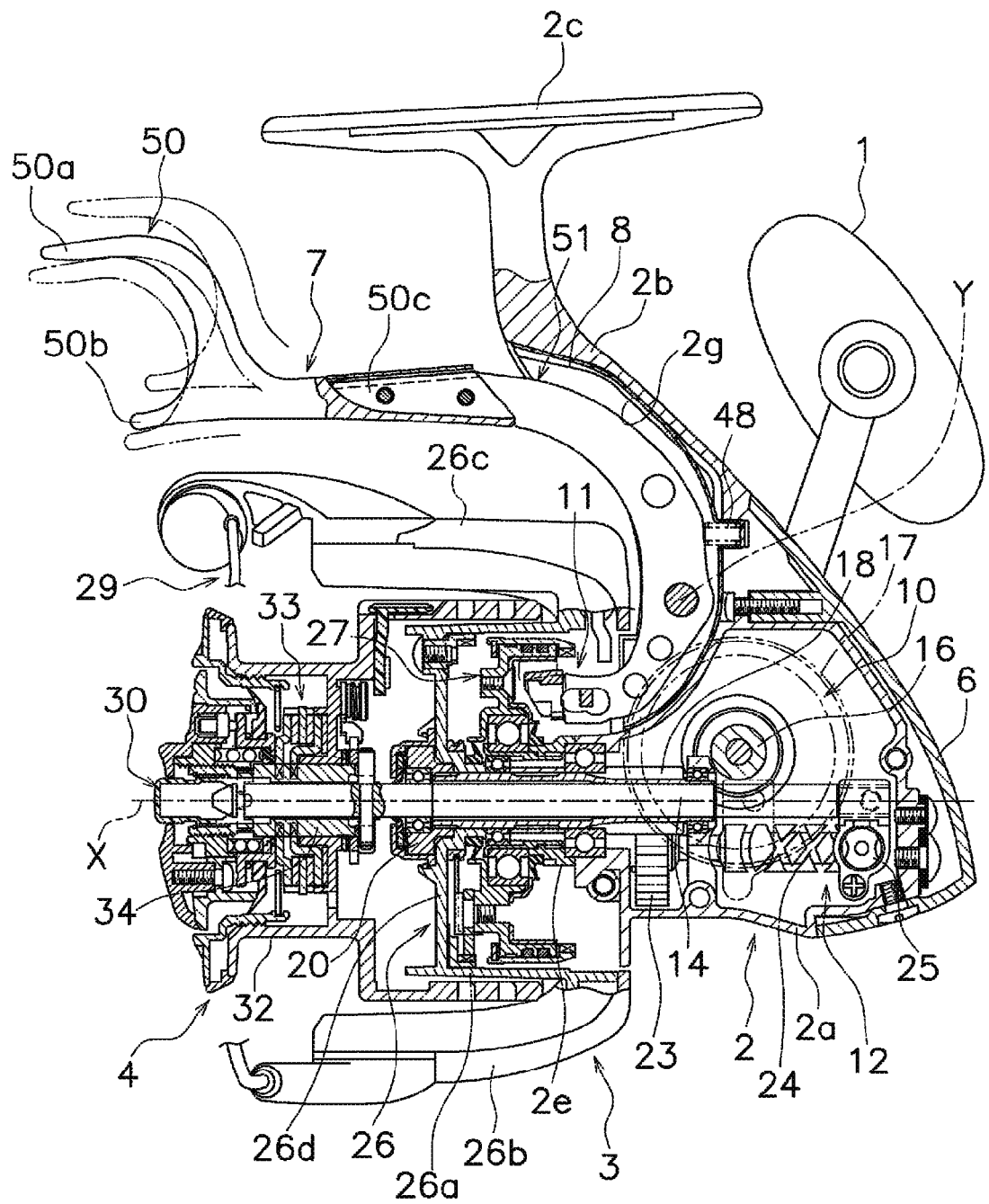
FIG. 1 is a lateral cross-sectional view of a spinning reel according to one embodiment of the present invention.

FIG. 1 shows a spinning reel that employs one embodiment of the present invention. This spinning reel is a lever brake-type reel that winds the fishing reel around a first axis X along the longitudinal direction of the fishing rod. The spinning reel comprises a reel body 2 comprising a handle assembly 1, a rotor 3 that is rotatably supported at the front part of the reel body 2 around the first axis X, and a spool 4 that winds the fishing line disposed at the front part of the rotor 3.

Figure 2:
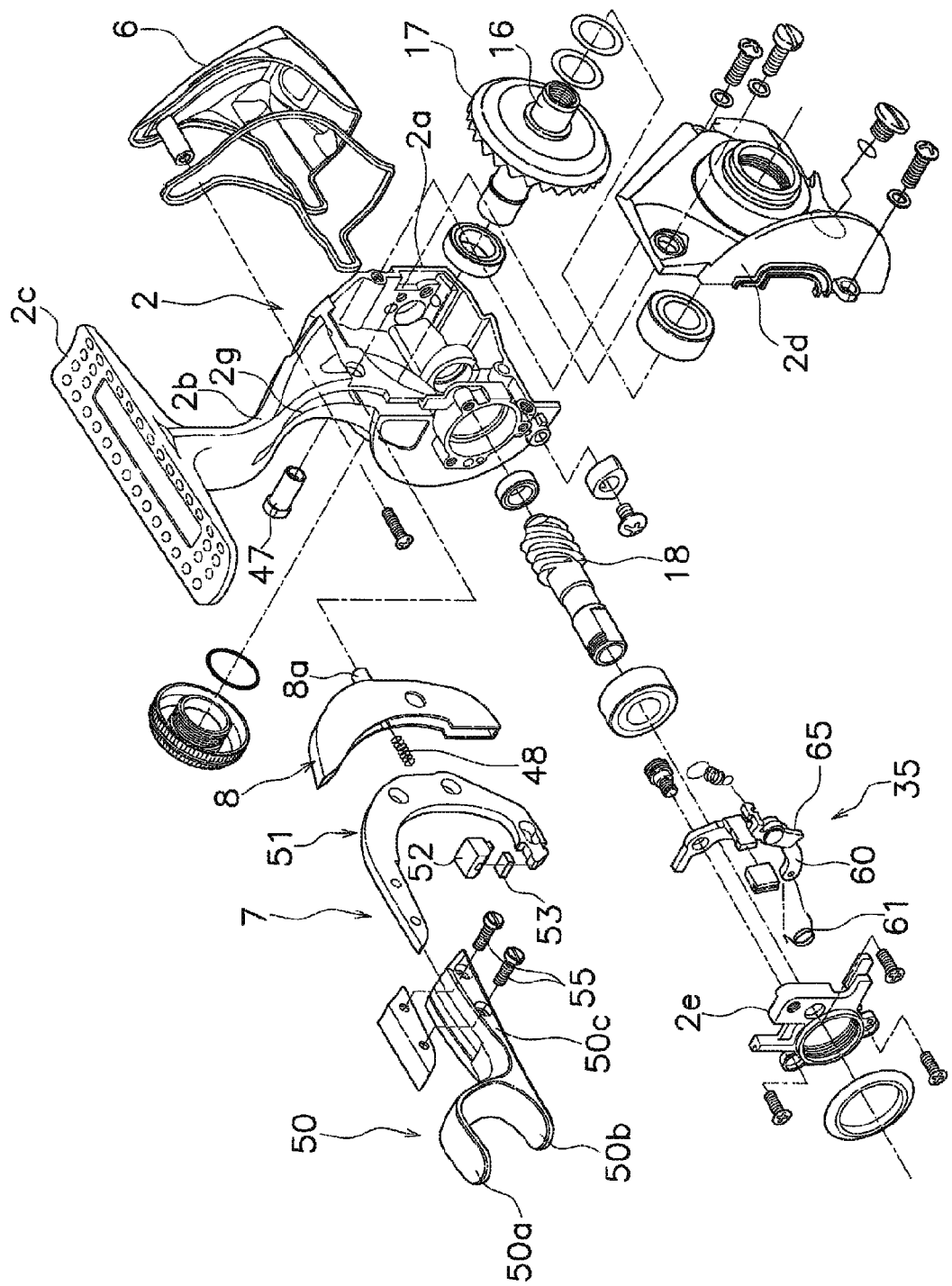
FIG. 2 is an exploded perspective view of a rotor braking device comprising a reel body.

The reel body Z, as shown in FIG. 1 and FIG. 2, comprises a mechanism housing section 2a, a leg section 2b, and a fishing pole mounting portion 2c. The mechanism housing section 2a has a space for mounting each of the mechanisms inside. The mechanism housing section 2a has an opening on one side part, and this opening is closed by a cover member 2d. Additionally, an attaching member 2e is mounted on the front of the mechanism housing section 2a. The leg section 2b is integrally formed with the mechanism housing section 2a and extends from the mechanism housing section 2a toward the fishing pole mounting portion 2c. The fishing pole mounting portion 2c is integrally formed with the leg section 2b at the tip of the leg section 2b and extends longer back and forth.

The rear part of the reel body 2 is covered by a guard member 6. A mounting groove 2g for housing a brake lever 7, as mentioned below, is formed on the front face of the leg section 2b. A sheet member 8 is mounted on the mounting groove 2g.

Inside of the mechanism housing section 2a are installed, as shown in FIG. 1, a rotor drive mechanism 10, a rotor braking device 11, and an oscillating mechanism 12. The rotor drive mechanism 10 is a mechanism for rotating the rotor 3 in conjunction with the handle assembly 1. The rotor braking device 11 is a device for breaking the rotation of the rotor 3 in the line delivering direction (the reverse rotation). The oscillating mechanism 12 is a mechanism for reciprocating the spool 4 back and forth via a spool shaft 14 in conjunction with the rotation of the handle assembly 1.

The rotor drive mechanism 10, as shown in FIG. 1 and FIG. 2, comprises a master gear shaft 16 to which the handle assembly 1 is integrally and rotatably fixed, a master gear 17 that rotates along with the master gear shaft 16, and a pinion gear 18 that engages with the master gear 17.

The master gear shaft 16 is integrally formed with the master gear 17 and is rotatably supported by the mechanism housing section 2a and a cover member 2d. The pinion gear 18 is formed into a tube shape, and the front part of the pinion gear extends to the spool 4 side in front of the rotor 3. Additionally, the front part of the pinion gear 18 is integrally and rotatably fixed to the rotor 3 by a nut 20. The tip part, the center part, and the rear part of the pinion gear 18 are each rotatably supported by the mechanism housing section 2a by an axle bearing.

The oscillating mechanism 12, as shown in FIG. 1 and FIG. 2, is a traverse camshaft type and comprises an intermediate gear 23 that meshes with the pinion gear 18, a screw shaft 24 that is rotatably mounted to the mechanism housing section 2a around an axis that is parallel with the spool shaft 14, and a slider 25 that moves back and forth with the rotation of the screw shaft 24.

The rotor 3 is rotatably supported by the reel body 2 and comprises a rotor main body 26 and a brake drum 27. The rotor main body 26 comprises a cylindrical member 26a, as well as a first arm section 26b and a second arm section 26c that are installed on the sides of the cylindrical member 26a facing each other. On the front part of the cylindrical member 26a is formed a front wall 26d that has a through-hole in the center. The pinion gear 18 extends through this through-hole that is formed on the front wall 26b. Additionally, as shown in FIG. 1, a bail arm 29 is pivotally installed between the tip of the first arm section 26b and the tip of the second arm section 26c. The fishing line is guided to the spool 4 by this bail arm 29.

The brake drum 27 forms the rotor braking device 11 along with the brake lever 7. This rotor braking device 11 will be described below.

The spool 4 is disposed between the first arm section 26b and the second arm section 26c of the rotor main body 26. The spool 4 is detachably and non-rotatably mounted on the tip of the spool shaft 14 via a one-touch detaching mechanism 30. The spool 4 comprises a spool main body 32, a drag mechanism 33 disposed in the spool main body 32, and a spool tube part 34 that rotatably supports the spool main body 32.

Figure 3:
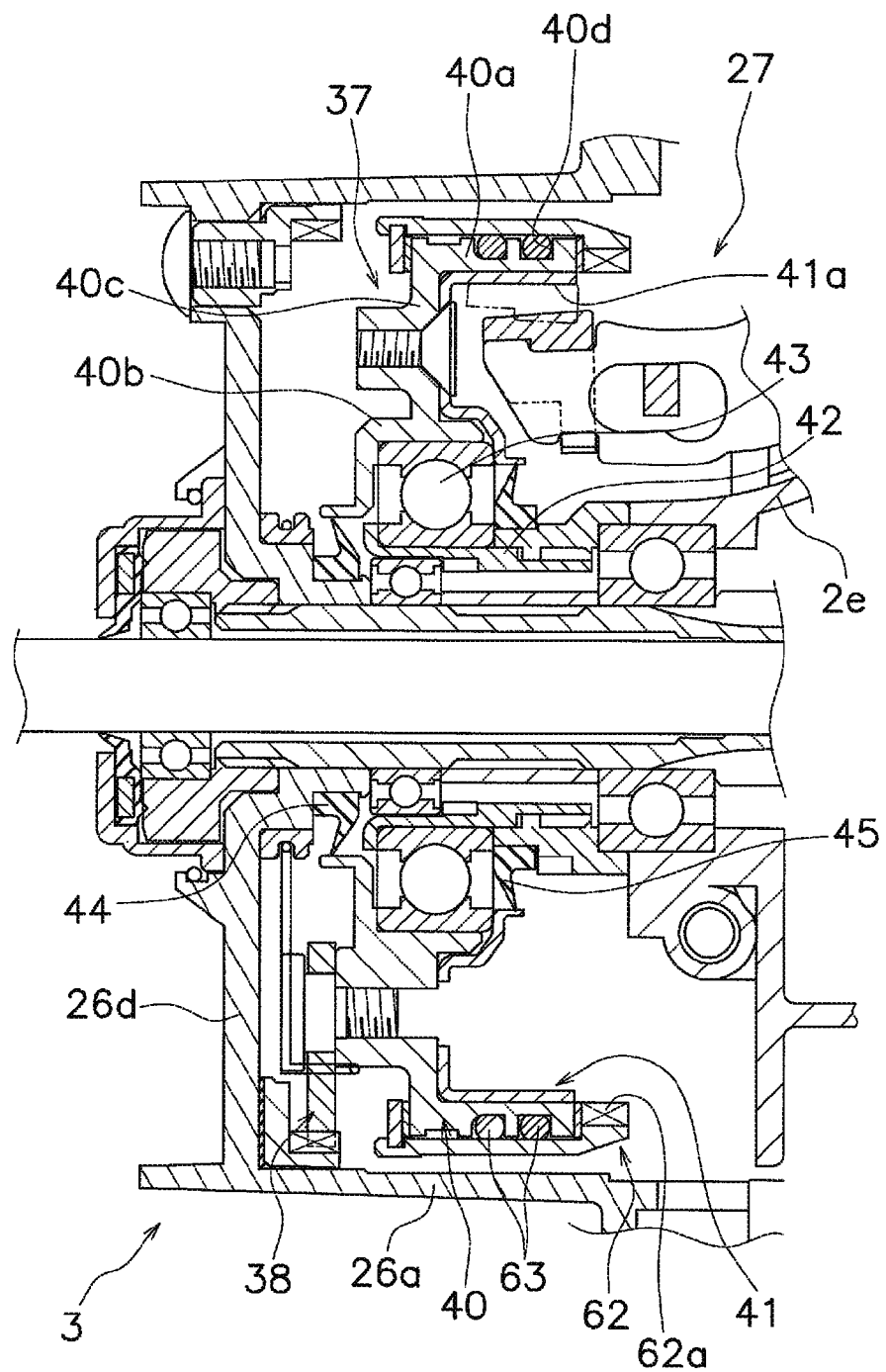
FIG. 3 is a partial cross-sectional view of the rotor braking device.

As shown in FIG. 1 to FIG. 3, the rotor braking device 11 mainly comprises a brake lever 7, a brake drum 27, and a braking control section 35 (refer to FIG. 2). The brake lever 7 is a member for adjusting the braking force of the brake drum 27. The braking control section 35 is a mechanism to switch between a braking state in which a predefined braking force is applied and a brake release state in which the brake is released, using the brake lever 7.

The brake drum 27, as shown in FIG. 3, comprises a brake drum main body 37 and a one-way clutch 38. The brake drum main body 37 comprises a braking surface 41 to which a braking force is applied when the tip of the brake lever 7 is pressed. The one-way clutch 38 couples/disconnects the rotor 3 and the brake drum main body 37 according to the rotating direction of the rotor 3.

The brake drum main body 37 comprises a tubular member 40 that is disposed concentrically with the rotor 3 on the inner peripheral side of a cylindrical member 26a of the rotor 3 and a braking surface 41 that is fixed on the inner peripheral surface of the tubular member 40.

The tubular member 40, as shown in FIG. 3, comprises an outer tube section 40a that is disposed concentrically on the inner peripheral side of the cylindrical member 26a, an inner tube section 40b that is disposed on the inner-peripheral side of the outer tube section 40a, and a disc section 40c that couples the outer tube section 40a and the inner tube section 40b. On the outer peripheral surface of the outer tube section 40a a plurality of ring-shaped grooves 40d is formed, to which the friction rings of the braking control section 35, mentioned below, are mounted. The inner tube section 40b is rotatably supported by the outer peripheral surface of the axle bearing support member 42 by an axle bearing 43. The axle bearing support member 42 is fixed to an attaching member 2e. Meanwhile, a sealing member 44 is mounted between the inner tube section 40b and the front wall 26d of the rotor 3.

The braking surface 41 extends from the inner peripheral surface of the outer tube section 40a toward the rear surface of the axle bearing 43 via the inner tube section 40b. The inner peripheral surface along the outer the section 40a of this braking surface 41 is the inner circumferential surface 41a. The braking surface 41 is screwed and fixed to the disc section 40c of the tubular member 40. Meanwhile, a sealing member 45 is mounted between the inner peripheral edge of the braking surface 41 and the attaching member 2c.

The one-way clutch 38 couples the rotor 3 and the tubular member 40 of the brake drum main body 37 only when the rotor 3 rotates in the line delivering direction and rotates the tubular member 40 in the time delivering direction in conjunction with the rotor 3. Therefore, when the rotor 3 rotates in the line winding direction, the rotor 3 and the tubular member 40 are cut off, and the rotation is not transmitted from the rotor 3 to the tubular member 40.

As shown in FIG. 1 and FIG. 2, the brake lever 7 is pivotally supported by the reel body 2 around the second axis Y by a support shaft 47 that is mounted to the leg section 2b of the reel body 2. Additionally, the brake lever 7 is biased in a direction away from the fishing pole mounting portion 2c by a spring member 48.

A mounting groove 2g is formed on the front surface of the leg section 2b, as mentioned above, and a sheet member 8 is mounted to the mounting groove 2g. The sheet member 8, as shown in FIG. 1 and FIG. 2, is a box-shaped member to which is mounted the mounting groove 2g and is crescent shaped from a side view. Additionally, a tube-shaped spring housing section 8a is formed on the bottom part of this sheet member 8, and the spring member 48 is housed in this spring housing section 8a. Meanwhile, the sheet member 8 is prevented from falling from the mounting groove 2g by the support shaft 47.

The brake lever 7 can be pivoted between a predefined braking position indicated by the dashed line in FIG. 1 and a braking position indicated by the chain double-dashed line, which is closer to the fishing pole mounting portion 2c than the brake release position shown by the solid line. Meanwhile, the brake lever 7 is, normally, retained in either the brake release position or the predefined braking position by the spring member 48 and the mechanism of the braking control section 35.

The brake lever 7 comprises an operating section 50 for performing a braking operation, a lever main body 51 that is pivotally supported by the mounting groove 2g of the leg section 2b, a brake shoe 52 that is mounted to the tip part of the lever main body 51, and an elastic member 53. The brake shoe 52 is disposed facing the inner circumferential surface 41a of the braking surface 41.

The operating section 50 is detachably coupled to the lever main body 51 by a plurality of bolts 55. The front tip part of the operating section 50 is branched and comprises a pull-out operation section 50a and a first push-in operation section 50b. This section further comprises a second push-in operating section 50c in the part that is coupled with the lever main body 51. The pull-out operation section 50a is used, for example, when a forefinger of the hand that holds the fishing pole (for example, the left hand) conducts a pull-in operation to apply the brakes to the rotor 3 according to the operating force. Additionally, the first push-in operating section 50b is used when pushed in with the forefinger of the hand that holds the fishing pole, and the second push-in operating section 50c is used when pushed in with the middle finger of the hand that holds the fishing pole.

More specifically, when pulling out the pull-out operation section 50a, the brake lever 7 pivots from the brake release position (indicated by the solid line in FIG. 1) toward the braking position (a position approaching the fishing pole mounting portion 2c, as indicated by the chain double-dashed line in FIG. 1). Additionally, when pushing in the first push-in operation section 50b or the second push-in operation section 50c, the brake lever 7 pivots from the brake release position toward the predefined braking position (a position away from the fishing pole mounting portion 2c, as indicated by the dashed line in FIG. 1).

Figure 4:
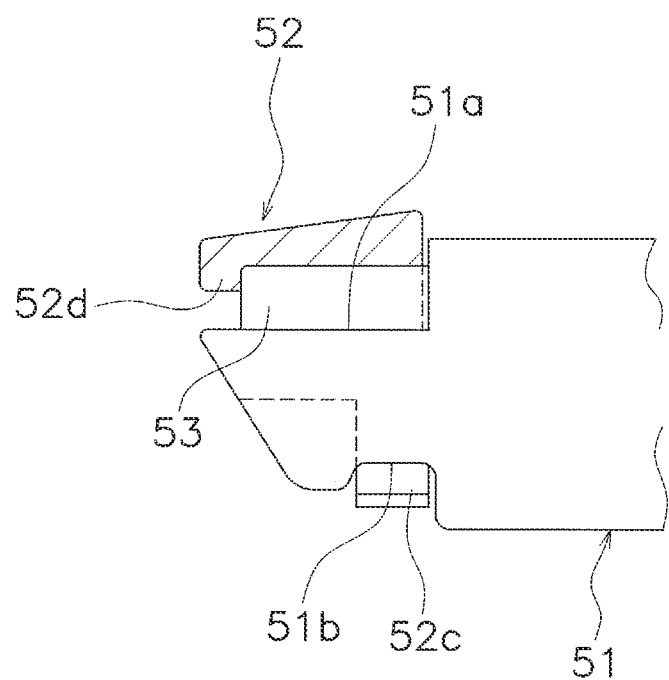
FIG. 4 is a cross-sectional view of the tip of the lever main body.
Figure 5:
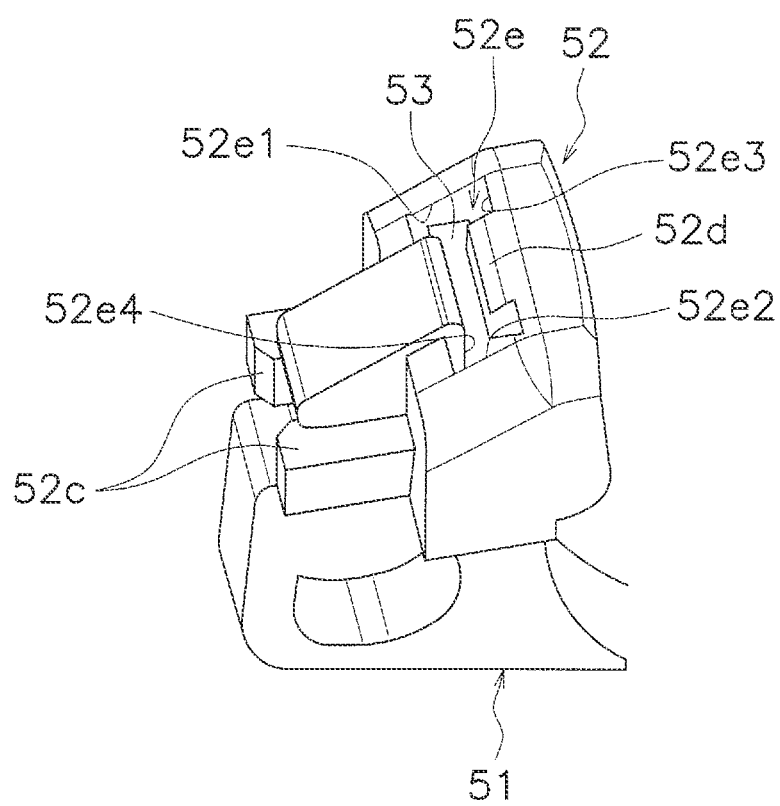
FIG. 5 is an external perspective view of the part shown in FIG. 4.
Figure 6:
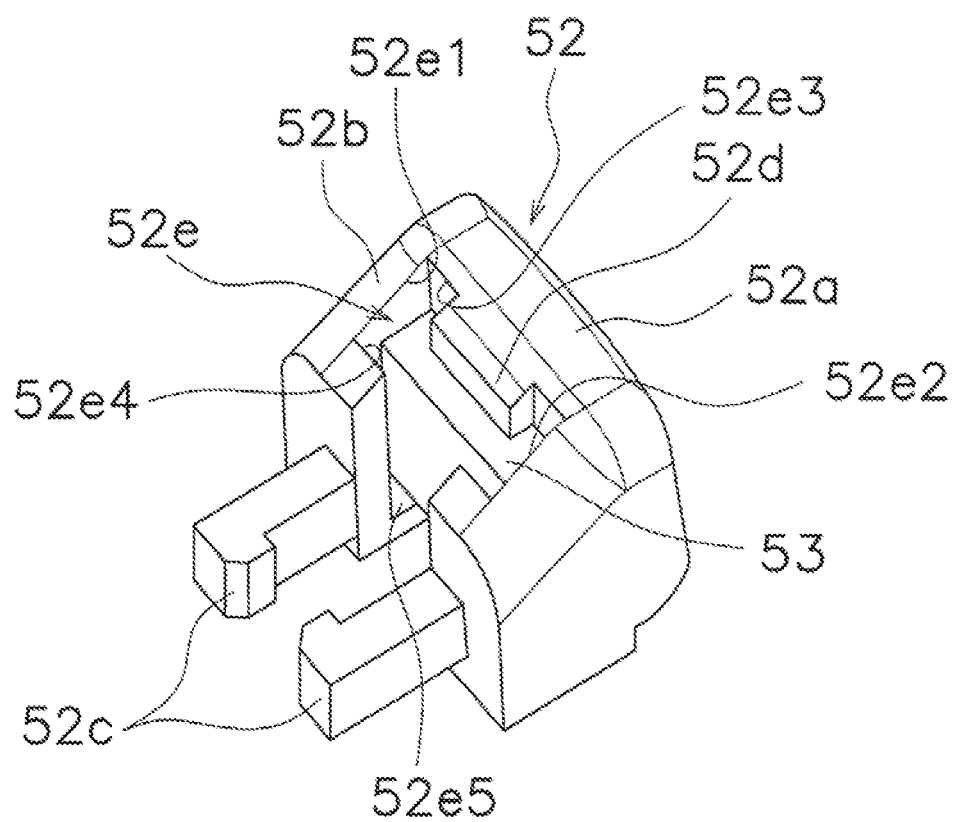
FIG. 6 is an external perspective view of the brake shoe and the elastic member.
Figure 7:
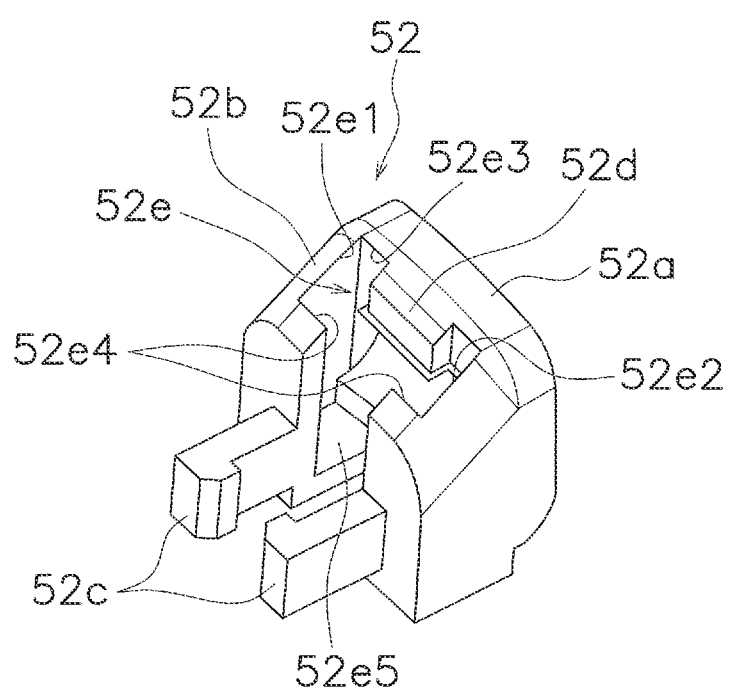
FIG. 7 is an external perspective view of the brake shoe.
Figure 8A:
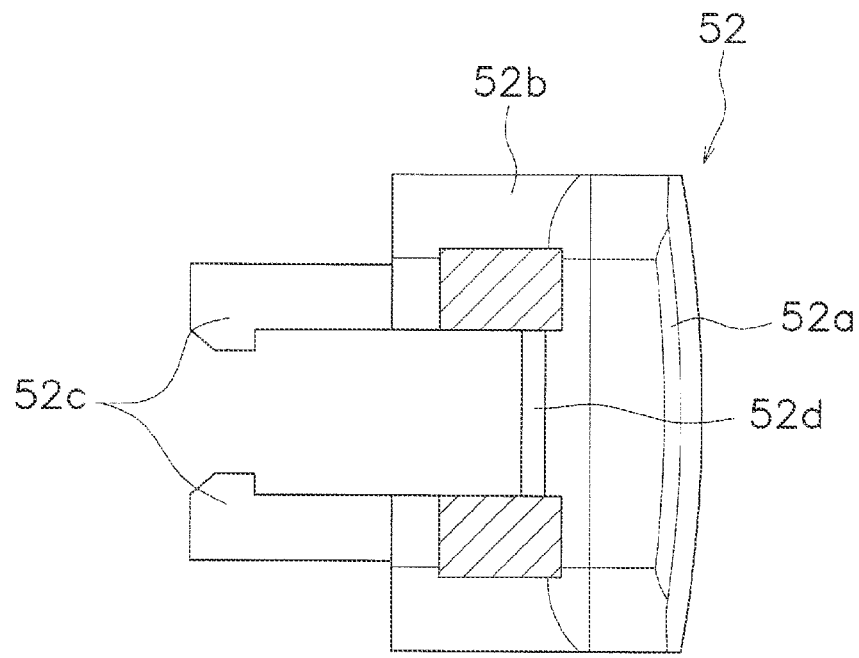
FIG. 8A is a plan view of the brake shoe.
Figure 8B:
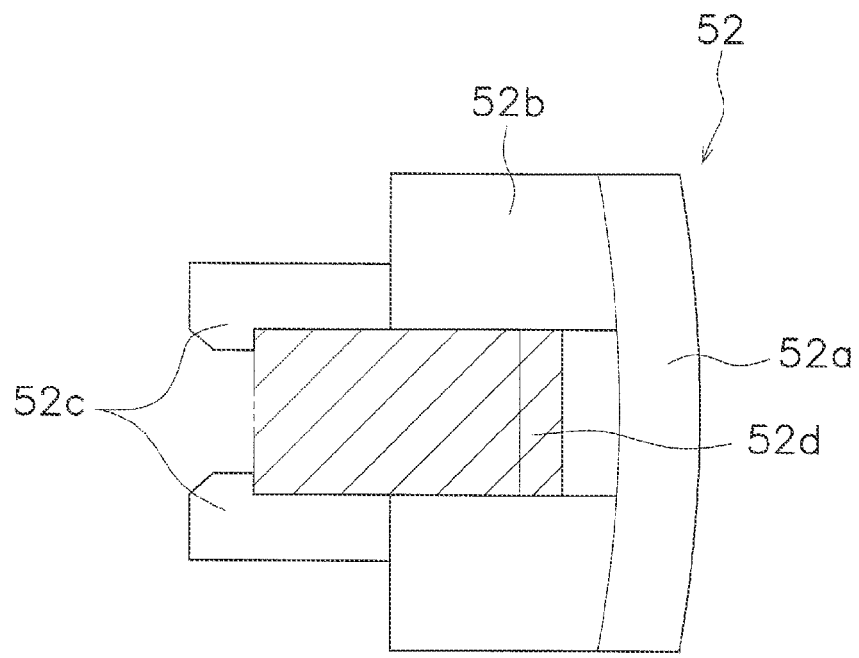
FIG. 8B is a bottom view of the brake shoe.

FIG. 4 shows a cross-sectional view of the tip part of the lever main body 51. Additionally, FIG. 5 shows the external perspective view, and FIG. 6 shows an external perspective view of the brake shoe 52. Furthermore, FIG. 7 shows an external perspective view of just the brake shoe 52; FIG. 8A shows the plan view, and FIG. 8B shows the bottom view.

As shown by these drawings, a brake shoe 52 that makes contact with the inner circumferential surface 41a of the braking surface 41 is detachably attached to the tip part of the lever main body 51. Additionally, an elastic member 53 is disposed between the brake shoe 52 and the lever main body 51.

On the tip of the lever main body 51, a pressing surface 51a is formed on the top part, and an engaging recess 51b is formed on the bottom part.

The brake shoe 52 is made of an elastic synthetic resin, such as a polyamide synthetic resin or polyacetal. The brake shoe 52 comprises an abutting section 52a that comes into contact with the inner circumferential surface 41a of the braking surface 41, a housing section 52b that houses the elastic member 53, and a pair of leg sections 52c that engages with the engaging recess 51b of the lever main body 51.

The upper surface of the abutting section 52a is pressed to the inner circumferential surface 41a of the braking surface 41. A protrusion (the deformation restricting mechanism) that protrudes to the lever main body 51 side with a predefined width is formed at the lower surface of the abutting section 52a. The protrusion amount of the protrusion 52d is less than the thickness of the elastic member 53 and is set taking into account the hardness of the elastic member 53 and the necessary braking force. Additionally, this protrusion 52d, as mentioned below, forms a part of the fall out prevention mechanism that prevents the elastic member 53 from falling out of the brake shoe 52.

The housing section 52b is formed on the lever main body 51 side of the abutting section 52a. The housing section 52b comprises a housing space 52e inside of which is housed the elastic member 53. In this housing space 52e, a wall is formed on two surfaces 52e1 and 52e2 of the part that oppose each other in the rotating direction of the rotor 3, as well as one surface 52e3 on the abutting section 52a side, which prevents the elastic member 53 from falling out or popping out of the housing space 52e. Additionally, an opening into which is inserted the tip of the lever main body 51 is formed on the surface 52e4 on the opposite side of the abutting section 52a side of the housing space 52e. Furthermore, on one surface 52e5 in the direction that is perpendicular to the rotating direction of the rotor 3, an opening that is narrower than the width of the elastic member 53 is formed. The other surface in the direction that is perpendicular to the rotating direction of the rotor 3 is also opened, and the elastic member 53 is detachable via this surface.

As described above, the elastic member 53 that is mounted to the housing space 52e is prevented from falling out of the housing space 52e by walls that are formed on the surfaces 52e1-52e5 beside the surface that is opened and a protrusion 52d that protrudes on the surface that is opened.

Meanwhile, when resin molding this brake shoe 52, the part shown by the oblique lines in FIG. 8A should be punched from above in FIG. 7, and the part shown by the oblique lines in FIG. 8B should be punched from below in FIG. 7. With this kind of punching, a fall out prevention mechanism can be easily formed without forming a plurality of protrusions, etc., for falling out, besides the protrusion 52*d*.

Additionally, when mounting the elastic member 53 to the brake shoe 52, the elastic member 53 is first inserted in the housing space 52*c* of the brake shoe 52 from above in FIG. 7. After the above, by attaching the brake shoe 52 to the lever main body 51, the elastic member 53 can be prevented from falling out from the housing space 52*c* after assembly.

The pair of leg sections 52*c* is formed extending from the housing section 52*b* to the opposite side of the abutting section 52*a*. Additionally, the tip of the pair of leg sections 52*c* engages with the engaging recess 51*b* of the lever main body 51. With this, the brake shoe 52 is fixed to the tip part of the lever main body 51.

The elastic member 53 is installed in the housing section 52*b* of the brake shoe 52. That is, the elastic member 53 is installed between the abutting section 52*a* of the brake shoe 52 and the pressing surface 51*a* of the lever main body 51; here, this member is fixed to the brake shoe 52 by an adhesive agent. The elastic member 53 is made of rubber that is less rigid than the brake shoe 52.

Meanwhile, the brake lever 7, when in a state of not being operated, is biased by the spring member 48 as shown by the solid line in FIG. 1, this lever is disposed in the brake release position. In this state, the brake shoe 52 is away from the braking surface 41.

Figure 9:
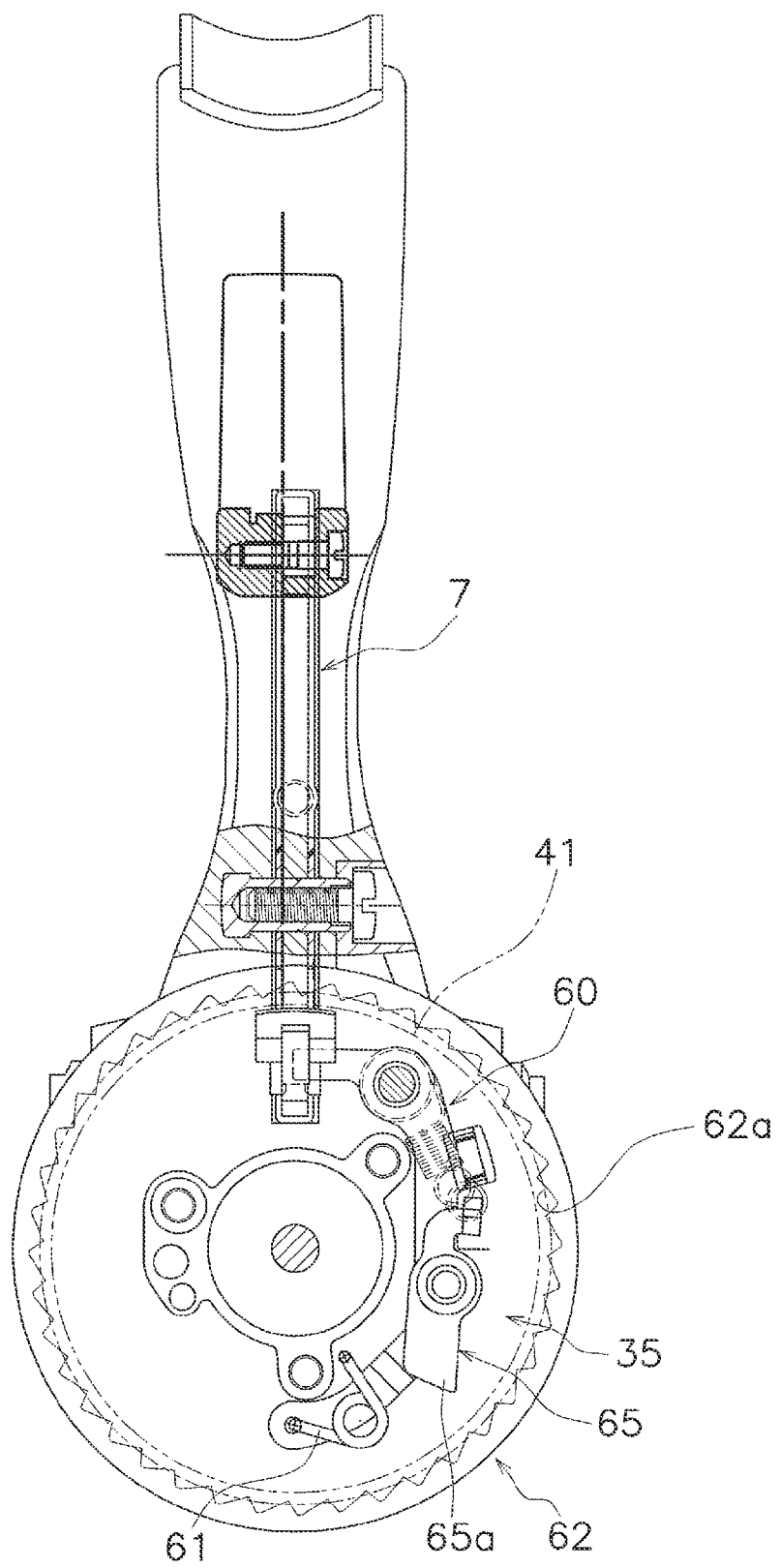
FIG. 9 is a frontal view of the braking control section.

The braking control section 35 comprises, as shown in FIG. 2, FIG. 3, and FIG. 9, a lever member 60 that swings in conjunction with the brake lever 7, a toggle spring 61, a friction member 62, and a friction ring 63. The toggle spring 61 retains the lever member 60 in the brake release position and the predefined braking position. The friction member 62 is rotatably mounted relative to the tubular member 40 and frictionally engages with the tubular member 40. The friction ring 63 consists of, for example, an O-ring and is mounted to each of two ring-shaped grooves 40*d* in order to frictionally engage the friction member 62 with the tubular member 40.

The lever member 60 is, as shown in FIG. 2 and FIG. 9, pivotally mounted to the rear surface of the attaching member 2*e* between the brake release position and the predefined braking position. A locking claw 65 is pivotally mounted to the lever member 60.

The friction member 62 is a tubular member that is rotatably mounted to the outer circumference of the tubular member 40. A serrated section 62*a* is formed on the inner circumferential surface of one end of the friction member 62 (the right end in FIG. 3) and engages with a claw 65*a* of the locking claw 65 protruding radially inward. The serrated section 62*a* is disposed to prohibit the rotation of the friction member 62 in the line delivering direction by engaging with the locking claw 65, when the lever member 60 is in the predefined braking position.

With such a configuration, if the brake lever 7 is pushed in to the predefined braking position, the lever member 60 will swing from the brake release position to the predefined braking position. As a result, the locking claw 65 engages with the serrated section 62*a* of the friction member 62. In this state, the friction member 62 frictionally slides against the tubular member 40 by the action of the friction ring 63, and the brakes are applied to the rotation of the rotor 3 in the line delivering direction in the predefined braking state.

One end of the toggle spring 61 is locked to the proximal end of the lever member 60, and the other end is locked to the front end surface of the mechanism housing section 2*a* of the reel body 2. Additionally the toggle spring 61 biases the lever member 60 and biases the brake lever 7 to the predefined braking position and the brake release position and can maintain that position.

When casting, by casting after tilting the bail arm 29 to a line releasing position, the fishing line is released from the outer circumference of the spool 4. When winding the line, if the handle assembly 1 is rotated in the line winding direction, the bail arm 29 is returned to a line winding position by a returning mechanism (not shown). The torque of the handle assembly 1 is transmitted to the pinion gear 18 via a master gear shaft 16 and the master gear 17. The torque that is transmitted to the pinion gear is transmitted to the rotor 3. At this time, since the rotor 3 rotates in the line winding direction, this torque is not transmitted to the tubular member 40 by the one-way clutch 38. Additionally, with the rotation of the pinion gear 18, the spool shaft 14 reciprocates in the anteroposterior direction.

In a state in which the brake lever 7 is not operated, the brake lever 7 is pressed by the action of the spring member 48 and the braking control section 35 and is disposed to the brake release position or the predefined braking position.

When reversing the rotor 3 to interact with fish, the braking force is adjusted by pulling out the pull-out operation section 50*a* of the brake lever 7 from the fishing pole mounting portion 2*c* with, for example, the forefinger.

When the fishing line is pulled by the fish and the rotor 3 reverses in the line delivering direction, the torque of the rotor 3 is transmitted to the tubular member 40 via the one-way clutch 38 and is further transmitted to the braking surface 41, and the rotor braking device 11 is in a state that can be stopped.

When the rotation of the rotor 3 is transmitted to the tubular member 40 by the one-way clutch 38, the braking surface 41 integrally rotates with the rotor 3. At this time, when the pull-out operation section 50*a* of the brake lever 7 is pulled out in the direction approaching the fishing pole mounting portion 2*c*, even if the brake lever 7 is in the predefined braking position, the lever member 60 swings to the brake release position side. As a result, the predefined braking state by the braking control section 35 is temporarily released. At this time, the toggle spring 61 is inverted by the swinging of the lever member 60, and the lever member 60 is biased to the brake release position side and is retained in the brake release position.

When, in this state, the brake lever 7 is operated in the direction approaching the fishing pole mounting portion 2*c*, the brake shoe 52 of the brake lever 7 strongly presses the inner peripheral surface of the braking surface 41 radially outward. This braking force can be adjusted by increasing or decreasing the force that is applied to the brake lever 7, so that the amount of reverse rotation of the rotor 3 can be freely adjusted. As a result, a braking force that corresponds to the operating force of the brake lever 7 is applied to the rotor 3. In this way, even if one forgets to release the predefined braking state, the predefined braking state can be released by pulling out the brake lever 7.

Here, if the brake lever 7 is operated, the brake shoe 52 is pressed against the inner circumferential surface 41*a*, and at this time, the elastic member 53 installed between the lever main body 51 and the abutting section 52*a* of the brake shoe 52 is elastically deformed. Therefore, the adjustment range of the braking force can be expanded, when compared to a conventional device in which an elastic member is not installed.

Additionally, if the brake lever 7 is operated with a strong force and the elastic member 53 is elastically deformed a certain degree, the protrusion 52*d* that is installed in the abutting section 52a of the brake shoe 52 will come into contact with the pressing surface 51a of the lever main body 51. If the brake lever 7 is further operated in this state, the force that is applied to the brake lever 7 is transmitted to the abutting section 52a of the brake shoe 52 directly from the lever main body 51 via the protrusion 52d. Therefore, after the elastic member 53 is elastically deformed a certain degree, the maximum braking force can be applied to the brake shoe 52.

Additionally, when relocating the fishing spot or housing the reel, the user's hand can be taken off of the pull-out operation section 50a, and either the first push-in operation section 50b or the second push-in operation section 50c is pushed in the direction away from the fishing pole mounting portion 2c. Then, the lever member 60 swings from the brake release position to the predefined braking position and is retained in that position by the toggle spring 61. As a result, the locking claw 65 engages with the serrated section 62a of the friction member 62, the rotation of the friction member 62 is prevented, and the reverse rotation of the rotor 3 is prevented.

The braking force at this time is set according to the elastic force of the friction ring 63 that is mounted between the friction member 62 and the tubular member 40. For this reason, even if something hits the handle assembly 1 while moving, a predefined braking force, which is strong enough so that the handle assembly 1 will not rotate, can be easily obtained, and a predefined braking force that is strong enough so that line slack will not occur while relocating fishing spots can be set. Additionally, since the brakes are applied due to the relative rotation of the friction member 62 and the tubular member 40, the braking force is less likely to fluctuate and will stabilize.

Furthermore, when the rotor 3 is moved from the predefined braking state to the brake release state to change the hanging length of the tackle or to ensure that fish will bite the tackle when fish are present, the brake lever 7 needs only to be operated slightly in the direction approaching the fishing pole mounting portion 2c. Then, as mentioned above, the lever member 60 is swung to the brake release position by the brake lever 7, and the predefined braking state is temporarily released.

An elastic member 53 with low rigidity is disposed between the lever main body 51 and the brake shoe 52, and the elastic member 53 is elastically deformed when the brake lever 7 is operated. According to the degree of this deformation of the elastic member 53, the pressing force against the rotor 3 of the brake shoe 52 can be changed. For this reason, the adjustment range of the braking force can be expanded, and the tension of the fishing line can be delicately controlled.

A protrusion 52d is formed in apart of the brake shoe 52, and the elastic deformation of the elastic member 53 is restricted to a predefined amount by this protrusion 52d. After the elastic member 53 is deformed a predefined amount, the operating force is directly transmitted from the lever main body 51 to the brake shoe 52. For this reason, even though an elastic member 53 is disposed between the brake shoe 52 and the lever main body 51, a large braking force can be obtained.

The elastic member 53 is disposed in a housing space of the housing section 52b of the brake shoe 52, and the elastic member 53 is prevented from falling out from surfaces other than one side surface. The elastic member is also prevented from falling out from the one side surface as well, after mounting the elastic member 53 to the brake shoe 52, by the protrusion 52d. Therefore, assembling the brake shoe, to which is mounted the elastic member 53, to the lever main body 51 is simple; additionally, after assembly, the elastic member 53 will not easily drop out of the housing space. In particular, since the one surface on which is formed an opening that the elastic member 53 passes through is positioned in a direction that intersects with the rotating direction of the rotor 3, the elastic member 53 is less likely to drop out of the internal space of the housing section 52b.

The present invention is not limited to the embodiment above, and various modifications and alterations can be made to the extent that they does not depart from the spirit of the invention.

In the above-described embodiment, the invention was includes a protrusion 52d that is formed in the abutting section 52a of the brake shoe 52, but the configuration of the deformation restricting mechanism is not limited to this structure. For example, the invention can be configured so that a protrusion is installed on the lever main body 51 side, and so that this protrusion comes into contact with the abutting section 52a of the brake shoe 52.

Figure 10:
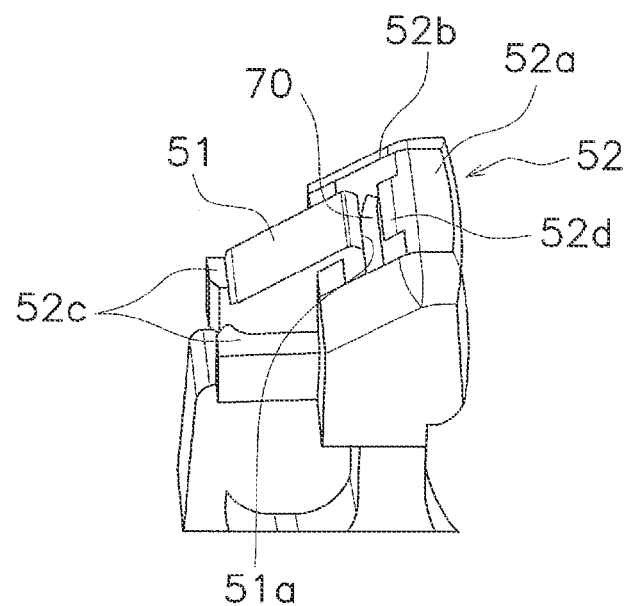
FIG. 10 is a diagram corresponding to FIG. 5 of another embodiment of the present invention.
Figure 11:
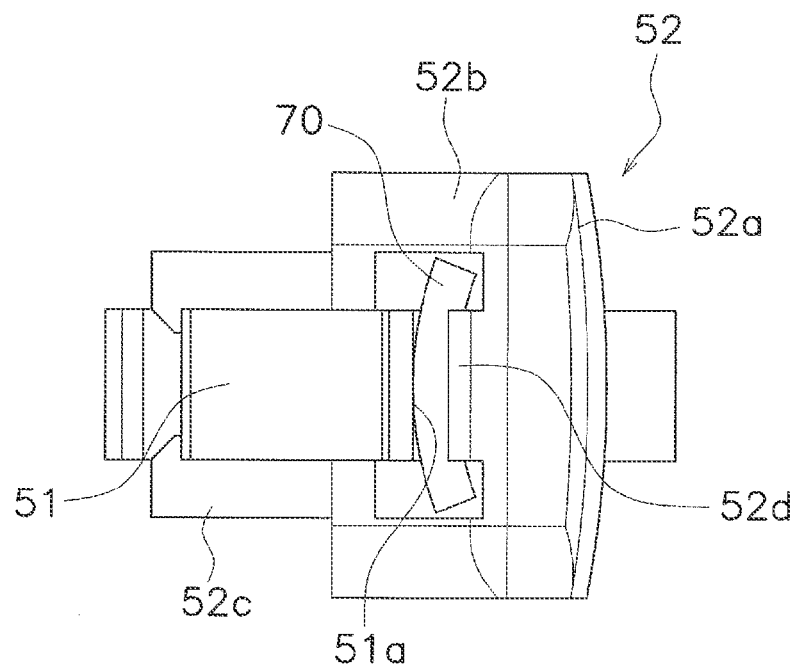
FIG. 11 is a frontal view of the part shown in FIG. 10.

In the above-described embodiment, the elastic member 53 is formed from rubber, but the material, etc., is not limited, as long as the elastic member 53 is a member that is less rigid than the brake shoe 52. Other examples of the elastic member are shown in FIG. 10 and FIG. 11. In this example, a plate spring 70 is the elastic member, and is disposed in the housing section 52b of the brake shoe 52. The plate spring 70 is formed extending along the rotating direction of the rotor 3, as well as curving so as to bulge to the lever main body 51 side.

Meanwhile, the shapes, etc., of the brake shoe 52 and the lever main body 51 are exactly the same as those in the above-described embodiment. Therefore, the same parts are given the same reference symbols.

Here, when the brake lever 7 is operated, the plate spring 70 is elastically deformed so that the distance between the abutting section 52a of the brake shoe 52 and the pressing surface 51a of the lever main body 51 changes. Even in this kind of configuration, the same kind of effects as those in the above-described embodiment can be obtained.

In the example shown in FIG. 5, the width of the elastic member 53 is formed to be wider than the width of the pressing surface 51a of the lever main body 51, but the width of the elastic member 53 can be made to have the same width as the pressing surface 51a of the lever main body 51. In the case that the widths of the elastic member 53 and the pressing surface 51a of the lever main body 51 are the same, damage in the interface between the part of the elastic member 53 that comes into contact with the pressing surface 51a and the other parts can be suppressed.

Figure 12:
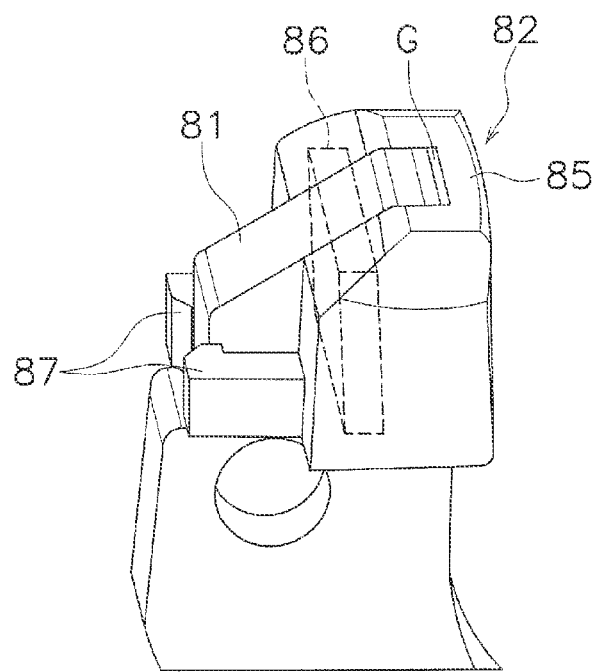
FIG. 12 is a diagram corresponding to FIG. 5 of yet another embodiment of the present invention.
Figure 13:
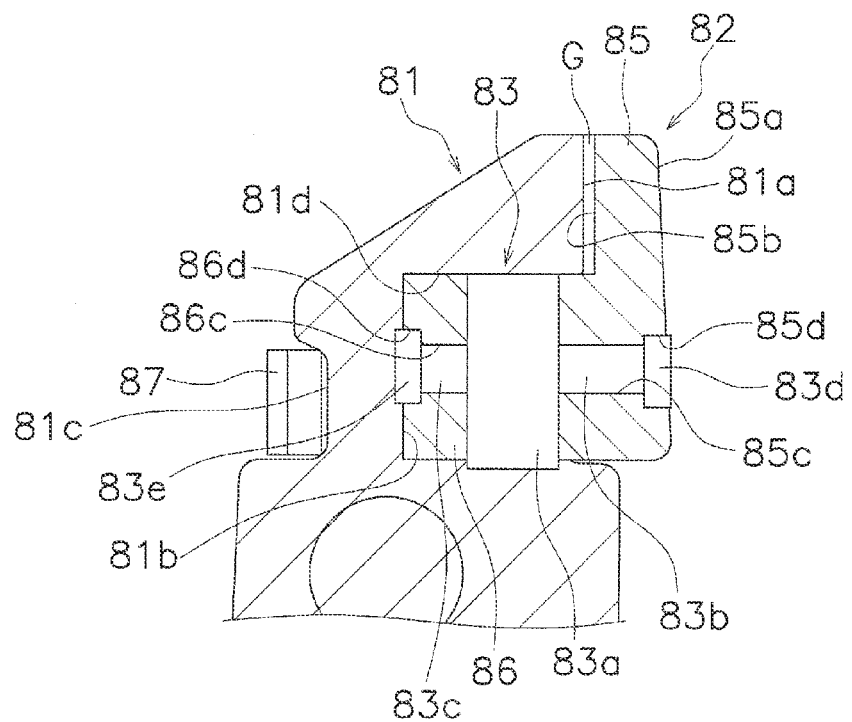
FIG. 13 is a cross-sectional block diagram of FIG. 12.

FIG. 12 and FIG. 13 show a lever main body 81, brake shoe 82, and an elastic member 83 according to another embodiment of the present invention.

The lever main body 81 differs from the above-described embodiment only in the tip part where the brake shoe 82 is mounted, and the other parts of configured in the same way as those in the above-described embodiment. Specifically, the tip part of the lever main body 81 comprises a regulating surface 81a, a pressing surface 81b, and an engaging recess 81c. The regulating surface opposes the brake shoe 82 with a gap in between them. A housing recess 81d is formed on the opposite side part of the tip of the regulating surface, and the bottom surface of this housing recess 81d is the pressing surface 81b. Meanwhile, the engaging recess 81c is the same as that in the above-described embodiment.

The brake shoe 82 is, like the above-described embodiment, an elastic synthetic resin such as a polyamide resin or polyacetal. The brake shoe 82 comprises an abutting section 85 that comes into contact with the braking surface 41, a center part 86 that is coupled via the elastic member 83, and a pair of leg sections 87 that engages with the engaging recess 81c of the lever main body 81. Here, the abutting section 85 and the pair of leg sections 87 are integrally formed by resin molding, and the center part is formed by a different member than the abutting section 85 and the pair of leg sections 87.

The upper surface of the abutting section 85 (the abutting surface 85a) is pressed by the inner circumferential surface 41a of the braking surface 41. As mentioned above, a predefined gap G is secured between the rear surface 85b of this abutting section 85 (the surface that is opposite of the surface that is pressed by the inner circumferential surface 41a) and the braking surface 81a of the lever main body 81. The abutting section 85 comprises a first through-hole 85c that extends through the abutting surface 85a toward the rear surface 85b. Additionally, a first engaging recess 85d with a diameter that is larger than the other parts is formed at the end part of the upper surface side of the first through-hole 85c.

The center part 86 is formed in a rectangular shape. Additionally, this center part 86 is housed in the housing recess 81d of the lever main body 81, and one side surface comes into contact with the pressing surface 81b. The center part 86 comprises a second through-hole 86c that extends through in the same direction as the first through-hole 85e in a position that corresponds to the first through-hole 85c of the abutting section 85. Furthermore, a second engaging recess 85d with a diameter that is larger than the other parts is formed at the end part of the pressing surface 81b side of the second through-hole 86c.

The elastic member 83 is made of rubber that is less rigid than the brake shoe 82 and comprises an elastic deformation section 83a, and a first and a second fixed section 83b and 83c. The elastic deformation section 83a is installed between the abutting section 85 of the brake shoe 82 and the center part 86 in the housing recess 81d of the lever main body 81. The first fixed section 83b extends from the elastic deformation section 83a to the abutting section 85 side, and the second fixed section 83c extends from the elastic deformation section 83a to the center part 86 side. The first fixed section 83b is inserted in the first through-hole 85c, and the second fixed section 83e is inserted in the second through-hole 86c. On each of the tip parts of the first and the second fixed sections 83b and 83c is formed a first engaging section 83d and a second engaging section 83e with diameters larger than the other parts. The first engaging section 83d engages with the first engaging recess 85d, and the second engaging section 83e engages with the second engaging recess 86d.

In this embodiment, when the operating lever 7 is operated, the brake shoe 82 is pressed against the inner circumferential surface 41a; at this time, the elastic member 83 (when implementing, the elastic deformation section 83a) that is installed between the lever main body 81 and the abutting section 85 of the brake shoe 82 is elastically deformed. Specifically, the pressing surface 81b of the lever main body 81 presses the abutting section 85 to the inner circumferential surface 41a side via the center part 86 and the elastic member 83. At this time, the pressing force is transmitted between the center part 86 and the abutting section 85 while the elastic deformation section 83a is elastically deformed. Therefore, when compared to a conventional device in which an elastic member is not installed, the adjustment range of the braking force can be expanded.

Additionally, when the brake lever 7 is operated with a strong force and the elastic member 83 is elastically deformed a certain degree, the rear surface 85h of the abutting section 85 of the brake shoe 82 comes into contact with the regulating surface 81a of the lever main body 81. If the brake lever 7 is further operated in this state the force that is applied to the brake lever 7 is transmitted to the abutting section 85 of the brake shoe 82 directly from the lever main body 81 via the regulating surface 81a. Therefore, after the elastic member 83 is elastically deformed a certain degree, the maximum braking force can be applied to the brake shoe 82.

Even in this kind of embodiment, the same kind of effects as those in the above-described embodiment can be obtained.

What is claimed is:

1. A braking operation lever for a rotor braking device of a spinning reel for fishing for applying a braking force to the rotation of a rotor, the braking operation lever comprising:
   a lever main body configured to be rotatably supported by a reel body;
   an operating section configured to perform a braking operation, and being disposed on a first end part of the lever main body;
   a brake shoe including an elastic member housing section, and being disposed on a second end part of the lever main body, and being configured to be pressed against the rotor by operation of the operating section;
   an elastic member disposed between the brake shoe and the lever main body, and within the elastic member housing section; and
   a fall out prevention mechanism preventing the elastic member from falling out of the brake shoe.

2. The braking operation lever for the rotor braking device of the spinning reel for fishing according to claim 1, wherein the elastic member is less rigid than the brake shoe, and when the brake shoe is pressed against the rotor, the elastic member will elastically deform and transmit the pressing force from the lever main body to the brake shoe.

3. The braking operation lever for the rotor braking device of the spinning reel for fishing according to claim 2, wherein the brake shoe comprises
   an abutting section having an end surface configured to contact the rotor, and being disposed on a first side of the brake shoe so as to form a gap between the abutting section and the lever main body,
   a pair of leg sections disposed on a second side of the brake shoe, the second side being opposite the first side, and engaging the lever main body,
   an elastic member housing section disposed between the abutting section and the pair of leg sections, and comprising a housing space inside of which the elastic member is housed, the elastic member being detachable from the housing space via only one opening formed in the elastic member housing section, and
   the fall out prevention mechanism including a protrusion disposed in walls that surround the housing space and the one opening.

4. The braking operation lever for the rotor braking device of the spinning reel for fishing according to claim 2, wherein the brake shoe comprises
   an abutting section having a first end surface and a second end surface, the first end surface configured to contact the rotor, the abutting section being disposed on a first side of the brake shoe so as to form a space between the abutting section and the lever main body, and comprising a first through-hole extending through the first end surface to the second end surface, a pair of leg sections disposed on a second side of the brake shoe, the second side being opposite the first side, and engaging the lever main body, and a center part disposed between the abutting section and the lever main body, and comprising a second through-hole extending through a side surface adjacent the abutting section side surface toward an opposite side surface, the abutting section and the pair of leg sections being integral and the center part is separate from the abutting section and the pair of leg sections, and the elastic member comprises an elastic deformation section disposed between the abutting section and the center part, and a first fixed section in the first through-hole and a second fixed section in the second through-hole, and the fall out prevention mechanism is a fixed section on the elastic member.

5. The braking operation lever for the rotor braking device of the spinning reel for fishing according to claim 2, further comprising a deformation restricting mechanism configured to restrict the elastic deformation of the elastic member to a predefined amount, and after the elastic member is elastically deformed to the predefined amount, the braking operation lever is configured to directly transmit the operating force of the operating section from the lever main body to the brake shoe.

6. The braking operation lever for the rotor braking device of the spinning reel for fishing according to claim 2, wherein the elastic member is rubber.

7. The braking operation lever for the rotor braking device of the spinning reel for fishing according to claim 1, wherein the brake shoe comprises an abutting section having an end surface configured to contact the rotor, and being disposed on a first side of the brake shoe so as to form a gap between the abutting section and the lever main body, a pair of leg sections disposed on a second side of the brake shoe, the second side being opposite the first side, and engaging the lever main body, an elastic member housing section disposed between the abutting section and the pair of leg sections, and comprising a housing space inside of which the elastic member is housed, the elastic member being detachable from the housing space via only one opening formed in the elastic member housing section, and the fall out prevention mechanism including a protrusion disposed in walls that surround the housing space and the one opening.

8. The braking operation lever for the rotor braking device of the spinning reel for fishing according to claim 7, further comprising a deformation restricting mechanism configured to restrict the elastic deformation of the elastic member to a predefined amount, and after the elastic member is elastically deformed to the predefined amount, the braking operation lever is configured to directly transmit the operating force of the operating section from the lever main body to the brake shoe.

9. The braking operation lever for the rotor braking device of the spinning reel for fishing according to claim 1, wherein the brake shoe comprises an abutting section having a first end surface and a second end surface, the first end surface being configured to contact the rotor, the abutting section being disposed on a first side of the brake shoe so as to form a space between the abutting section and the lever main body, and comprising a first through-hole extending through the first end surface to the second end surface, a pair of leg sections disposed on a second side of the brake shoe, the second side being opposite the first side, and engaging the lever main body, and a center part disposed between the abutting section and the lever main body, and comprising a second through-hole extending through a side surface adjacent the abutting section side surface toward an opposite side surface, the abutting section and the pair of leg sections being integral and the center part is separate from the abutting section and the pair of leg sections, and the elastic member comprises an elastic deformation section disposed between the abutting section and the center part, and a first fixed section in the first through-hole and a second fixed section in the second through-hole, the fall out prevention mechanism being a fixed section on the elastic member.

10. The braking operation lever for the rotor braking device of the spinning reel for fishing according to claim 9, wherein the first through-hole has a first engaging recess with a diameter that is larger than the first through-hole at the first end surface, and the second through-hole has a second engaging recess with a diameter that is larger than the second through-hole at the opposite side surface, and the fixed section of the elastic member comprises a first engaging section and a second engaging section engaging the first engaging recess and the second engaging recess, respectively.

11. The braking operation lever for the rotor braking device of the spinning reel for fishing according to claim 9, further comprising a deformation restricting mechanism configured to restrict the elastic deformation of the elastic member to a predefined amount, and after the elastic member is elastically deformed to the predefined amount, the braking operation lever is configured to directly transmit the operating force of the operating section from the lever main body to the brake shoe.

12. The braking operation lever for the rotor braking device of the spinning reel for fishing according to claim 10, further comprising a deformation restricting mechanism configured to restrict the elastic deformation of the elastic member to a predefined amount, and after the elastic member is elastically deformed to the predefined amount, the braking operation lever is configured to directly transmit the operating force of the operating section from the lever main body to the brake shoe.

13. The braking operation lever for the rotor braking device of the spinning reel for fishing according to claim 1, further comprising a deformation restricting mechanism configured to restrict the elastic deformation of the elastic member to a predefined amount, and after the elastic member is elastically deformed to the predefined amount, the braking operation lever is configured to directly transmit the operating force of the operating section from the lever main body to the brake shoe.

14. The braking operation lever for the rotor braking device of the spinning reel for fishing according to claim 1, wherein the elastic member is rubber.

15. A spinning reel for fishing, the spinning reel comprising a rotor braking device comprising the braking operation lever according to claim 1, and being configured to apply a braking force to the rotation of the rotor, a reel body comprising a fishing pole mounting portion and a leg section extending from the fishing pole mounting portion, a rotor that is rotatably mounted to the reel body.

16. The spinning reel for fishing recited in claim 15, wherein the rotor includes a rotor main body rotatably supported by the reel body, and a brake drum rotatably supported by the reel body, the brake drum comprising a brake drum main body comprising a braking surface with which the brake shoe is configured to contact, and a one-way clutch configured to transmit only the rotation of the rotor main body in a line delivering direction to the braking drum main body.

17. A braking operation lever for a rotor braking device of a spinning reel for fishing for applying a braking force to the rotation of a rotor, the braking operation lever comprising:

a lever main body configured to be rotatably supported by a reel body;

an operating section configured to perform a braking operation, and being disposed on a first end part of the lever main body, a brake shoe disposed on a second end part of the lever main body, and being configured to be pressed against the rotor by operation of the operating section;

an elastic member disposed between the brake shoe and the lever main body; and a fall out prevention mechanism preventing the elastic member from falling out of the brake shoe, the brake shoe comprises an abutting section having an end surface configured to contact the rotor, and being disposed on a first side of the brake shoe so as to form a gap between the abutting section and the lever main body, a pair of leg sections disposed on a second side of the brake shoe, the second side being opposite the first side, and engaging the lever main body, an elastic member housing section disposed between the abutting section and the pair of leg sections, and comprising a housing space inside of which the elastic member is housed, the elastic member being detachable from the housing space via only one opening formed in the elastic member housing section, and the fall out prevention mechanism being a protrusion disposed in walls that surround the housing space and the one opening.

18. A braking operation lever for a rotor braking device of a spinning reel for fishing for applying a braking force to the rotation of a rotor, the braking operation lever comprising:

a lever main body configured to be rotatably supported by a reel body;

an operating section configured to perform a braking operation, and being disposed on a first end part of the lever main body;

a brake shoe disposed on a second end part of the lever main body, and being configured to be pressed against the rotor by operation of the operating section;

an elastic member disposed between the brake shoe and the lever main body; and a fall out prevention mechanism preventing the elastic member from falling out of the brake shoe, the brake shoe comprising an abutting section having a first end surface and a second end surface, the first end surface being configured to contact the rotor, the abutting section being disposed on a first side of the brake shoe so as to form a space between the abutting section and the lever main body, and comprising a first through-hole extending through the first end surface to the second end surface, a pair of leg sections disposed on a second side of the brake shoe, the second side being opposite the first side, and engaging the lever main body, and a center part disposed between the abutting section and the lever main body, and comprising a second through-hole extending through a side surface adjacent the abutting section side surface toward an opposite side surface, the abutting section and the pair of leg sections being integral and the center part is separate from the abutting section and the pair of leg sections, and the elastic member comprises an elastic deformation section disposed between the abutting section and the center part, and a first fixed section in the first through-hole and a second fixed section in the second through-hole, the fall out prevention mechanism being a fixed section on the elastic member.

* * * * *